(12) United States Patent
Bekki et al.

(10) Patent No.: US 10,161,555 B2
(45) Date of Patent: Dec. 25, 2018

(54) COATED EXPANDABLE-CONTRACTIBLE FLEXIBLE PIPE

(71) Applicant: WATERWORKS TECHNOLOGY DEVELOPMENT ORGANIZATION CO., LTD., Osaka-shi, Osaka (JP)

(72) Inventors: Hiroyuki Bekki, Osaka (JP); Yasuyuki Nagamori, Osaka (JP)

(73) Assignee: Waterworks Technology Development Organization Co., Ltd., Osaka-shi, Osaka (JP)

( * ) Notice: Subject to any disclaimer, the term of this patent is extended or adjusted under 35 U.S.C. 154(b) by 83 days.

(21) Appl. No.: 15/300,386

(22) PCT Filed: Feb. 23, 2015

(86) PCT No.: PCT/JP2015/055025
§ 371 (c)(1),
(2) Date: Sep. 29, 2016

(87) PCT Pub. No.: WO2015/151646
PCT Pub. Date: Oct. 8, 2015

(65) Prior Publication Data
US 2017/0138527 A1 May 18, 2017

(30) Foreign Application Priority Data
Mar. 31, 2014 (JP) .................. 2014-072674

(51) Int. Cl.
*F16L 58/18* (2006.01)
*F16L 27/04* (2006.01)
(Continued)

(52) U.S. Cl.
CPC ............. *F16L 58/18* (2013.01); *F16L 27/026* (2013.01); *F16L 27/04* (2013.01); *F16L 27/12* (2013.01)

(58) Field of Classification Search
CPC ......... F16L 27/04; F16L 27/12; F16L 27/125; F16L 51/02; F16L 58/1054; F16L 58/18
(Continued)

(56) References Cited

U.S. PATENT DOCUMENTS 3,427,051 A * 2/1969 White .................. F16L 27/026
277/398
3,669,470 A * 6/1972 Deurloo ................. H01R 13/56
285/45
(Continued)

FOREIGN PATENT DOCUMENTS

CN 1266157 A 9/2000
CN 1490547 A 4/2004
(Continued)

OTHER PUBLICATIONS

Extended European Search Report dated Oct. 26, 2017 in application No. 15774158.8.
(Continued)

*Primary Examiner* — Aaron M Dunwoody
(74) *Attorney, Agent, or Firm* — Procopio, Cory, Hargreaves & Savitch LLP

(57) ABSTRACT

There is provided a coated expandable-contractible flexible pipe capable of properly securing the anti-corrosive performance without damaging a coating even in the case where the coated expandable-contractible flexible pipe coated with the coating oscillates or expands/contracts. The coated expandable-contractible flexible pipe includes: an expandable-contractible flexible pipe having a pair of joints to be connected to a fluid pipe and a connecting pipe for connecting the joints to each other, the pair of joints being mutually oscillatable and expandable/contractible; and a resin or rubber coating that coats the expandable-contractible flexible pipe. The coating includes a joint coating portion in close contact with the joint, a pipe coating portion in close
(Continued)

contact with the connecting pipe 3, and a looseness portion formed between the joint coating portion and the pipe coating portion so as to allow the oscillation or expansion of the expandable-contractible flexible pipe.

13 Claims, 9 Drawing Sheets

(51) Int. Cl.
*F16L 27/12* (2006.01)
*F16L 27/02* (2006.01)

(58) Field of Classification Search
USPC .................................. 285/45, 298, 302, 299
See application file for complete search history.

(56) References Cited

U.S. PATENT DOCUMENTS

| | | | | | |
|---|---|---|---|---|---|
| 3,738,383 | A | * | 6/1973 | David | F16K 27/12 137/381 |
| 4,779,650 | A | * | 10/1988 | Sargent | B60R 15/00 137/599.02 |
| 5,340,165 | A | * | 8/1994 | Sheppard | F01N 13/1811 285/226 |
| 5,799,702 | A | * | 9/1998 | Hsien-Jen | F16L 27/12 138/114 |
| 5,897,146 | A | * | 4/1999 | Saito | F16L 27/026 285/145.3 |
| 6,056,329 | A | * | 5/2000 | Kitani | F16L 27/026 285/145.3 |
| 6,237,965 | B1 | * | 5/2001 | Kuo | F16L 27/026 285/111 |
| 6,250,690 | B1 | * | 6/2001 | Sakai | F16L 27/026 285/145.3 |
| 6,257,625 | B1 | | 7/2001 | Kitani et al. | |
| 6,883,550 | B2 | * | 4/2005 | Bekki | F16L 27/026 138/120 |
| 2003/0217778 | A1 | * | 11/2003 | Challender | F16L 27/06 138/114 |
| 2004/0040606 | A1 | | 3/2004 | Bekki et al. | |
| 2012/0217737 | A1 | * | 8/2012 | Johnson | F16L 51/02 285/39 |
| 2012/0242081 | A1 | * | 9/2012 | Keays | F16L 27/053 285/145.3 |
| 2012/0280487 | A1 | * | 11/2012 | Jaffari | F16L 27/026 285/45 |
| 2015/0338003 | A1 | * | 11/2015 | Saito | F16L 27/12 285/261 |
| 2016/0178100 | A1 | * | 6/2016 | Fujita | F16L 27/12 285/298 |

FOREIGN PATENT DOCUMENTS

| | | |
|---|---|---|
| EP | 0810354 A1 | 1/2003 |
| FR | 1244446 A | 10/1960 |
| JP | H05-008175 U | 2/1993 |
| JP | H08-086381 A | 4/1996 |
| JP | H11-094186 A | 4/1999 |
| JP | 2000-205474 A | 7/2000 |
| JP | 2004-324769 A | 11/2004 |

OTHER PUBLICATIONS

International Preliminary Report on Patentability (Chapter 1) received in related International patent application No. PCT/JP2015/055025, dated Oct. 13, 2016, 7 pages.
Office action issued in corresponding Chinese Patent Application No. 201580014121.4 dated Apr. 20, 2017.
Office Action issued in corresponding Japanese patent application No. 2014-072674. dated Jul. 28, 2017.
Communication pursuant to Article 94(3) EPC dated Sep. 11, 2018 in the European application No. 15774158.8, 4 pages.

* cited by examiner

FIG. 9B
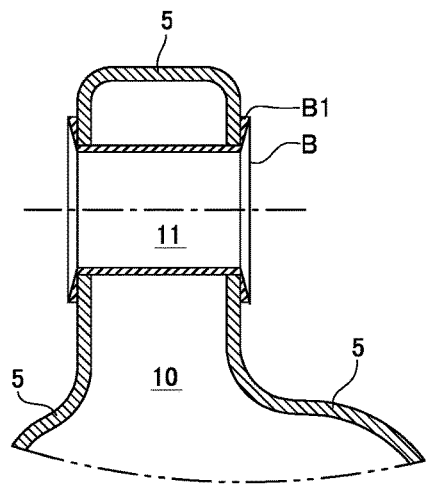
FIG. 9C
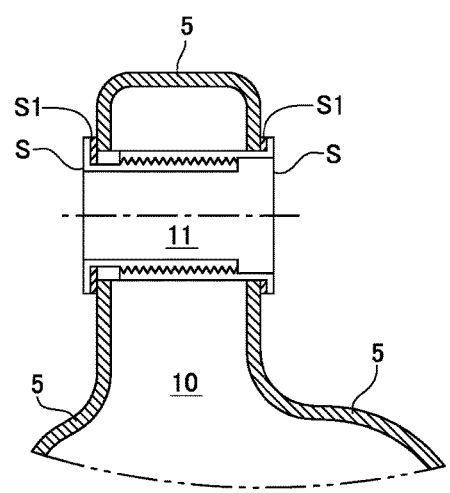
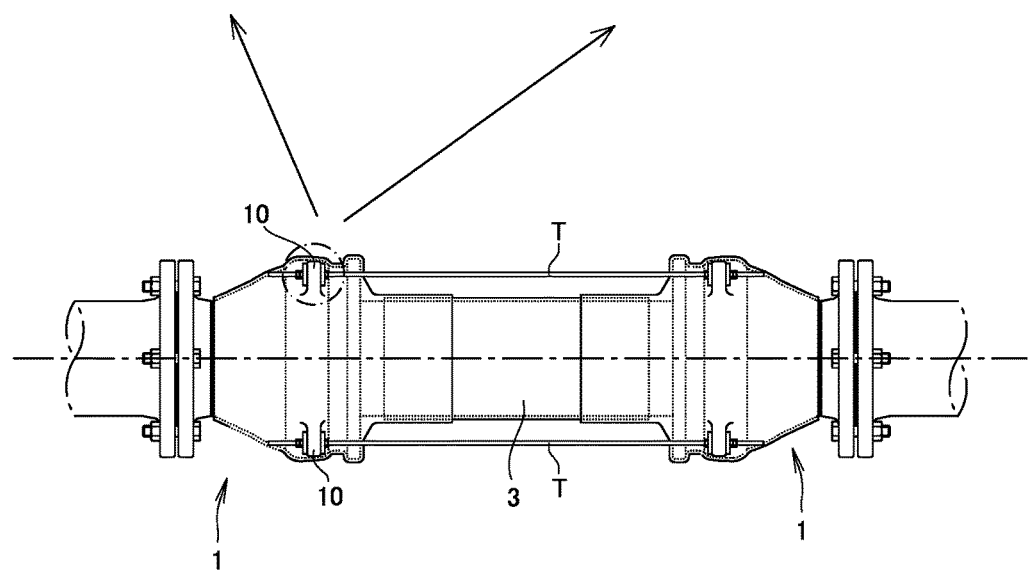
FIG. 9A

COATED EXPANDABLE-CONTRACTIBLE FLEXIBLE PIPE

TECHNICAL FIELD

This disclosure relates to a coated expandable-contractible flexible pipe that is connected to a fluid pipe such as a water pipe and is embedded in the ground.

BACKGROUND ART

There has been known an expandable-contractible flexible pipe including a pair of joints to be connected to a fluid pipe such as a water pipe and a connecting pipe for connecting the joints to each other, wherein the joints are configured to be mutually oscillatable and expandable/contractible (see, for example, Patent Document 1).

PRIOR ART DOCUMENTS

Patent Documents

Patent Document 1: JP-A-2004-324769

SUMMARY OF THE INVENTION

Problems to be Solved by the Invention

In the case where an expandable-contractible flexible pipe is embedded in corrosive soil in a coastal reclaimed land or the like, the anti-corrosiveness of the expandable-contractible flexible pipe needs to be secured. Although the expandable-contractible flexible pipe is coated with a coating material, a risk of generation of rust is possibly caused by a pinhole formed at the time of fabrication or a crack made at the time of installation.

In view of this, it is conceived that an expandable-contractible flexible pipe is coated with a resin or rubber coating. Since an expandable-contractible flexible pipe embedded in the ground oscillates or expands/contracts in the case of soil subsidence, the anti-corrosion needs to be properly secured even after the oscillation or the expansion/contraction.

The present disclosure has been accomplished by focusing attention on the above-described problem. Therefore, its object is to provide a coated expandable-contractible flexible pipe capable of properly securing the anti-corrosive performance without damaging a coating even in the case where the coated expandable-contractible flexible pipe coated with the coating oscillates or expands/contracts.

Means for Solving the Problems

In order to achieve the above-described object, the present disclosure takes the following measures.

In other words, according to the present disclosure, there is provided a coated expandable-contractible flexible pipe including an expandable-contractible flexible pipe including a pair of joints to be connected to a fluid pipe and a connecting pipe for connecting the joints to each other, the pair of joints being mutually oscillatable and expandable/contractible; and a resin or rubber coating that coats the expandable-contractible flexible pipe, wherein the coating includes a joint coating portion in close contact with the joint, a pipe coating portion in close contact with the connecting pipe, and a looseness portion formed between the joint coating portion and the pipe coating portion so as to allow the oscillation or expansion of the expandable-contractible flexible pipe.

As mentioned above, the coating is brought into close contact with the expandable-contractible flexible pipe. The looseness portion allows the oscillation or expansion/contraction of the pipe. Therefore, even if the coated expandable-contractible flexible pipe embedded in the ground is bent or expands, the coating can follow the oscillation or expansion/contraction, and therefore, the coating cannot be broken, so as to properly secure the anti-corrosive performance of the expandable-contractible flexible pipe.

BRIEF DESCRIPTION OF THE DRAWINGS

FIG. 9A-9C are further views showing a connected portion between an expandable-contractible flexible pipe and a fluid pipe.

MODE FOR CARRYING OUT THE INVENTION

<First Embodiment>

Hereinafter, a first embodiment according to the present disclosure will be described with reference to the attached drawings.

Figure 1A:
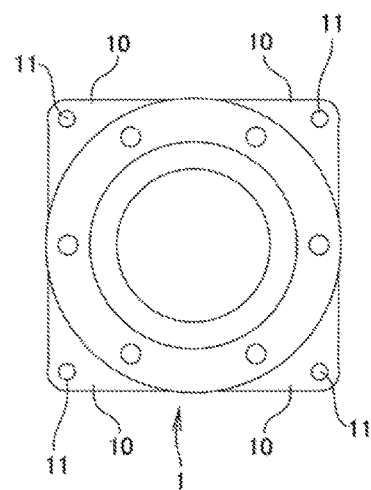
FIG. 1A is a front view showing an expandable-contractible flexible pipe.
Figure 1B:
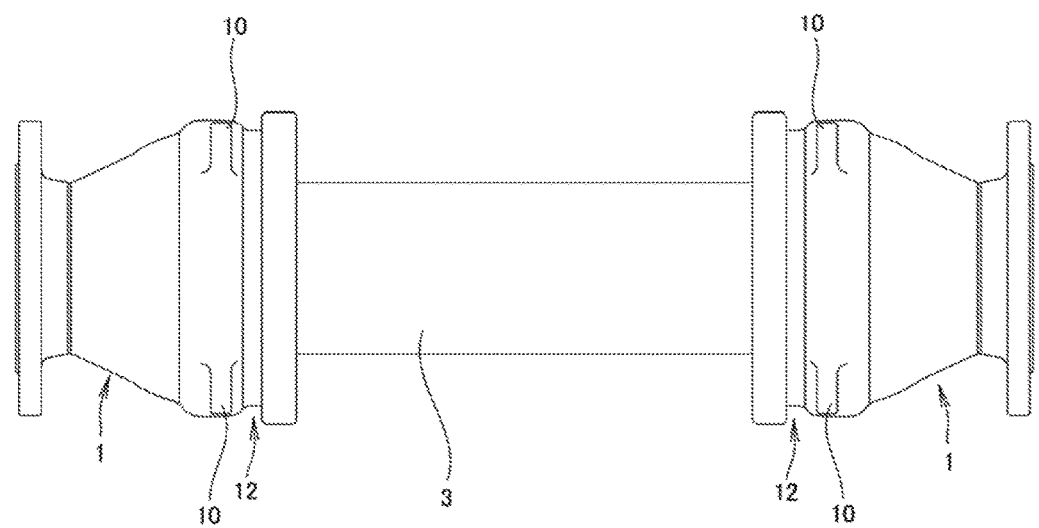
FIG. 1B is a side view showing the expandable-contractible flexible pipe.
Figure 2:
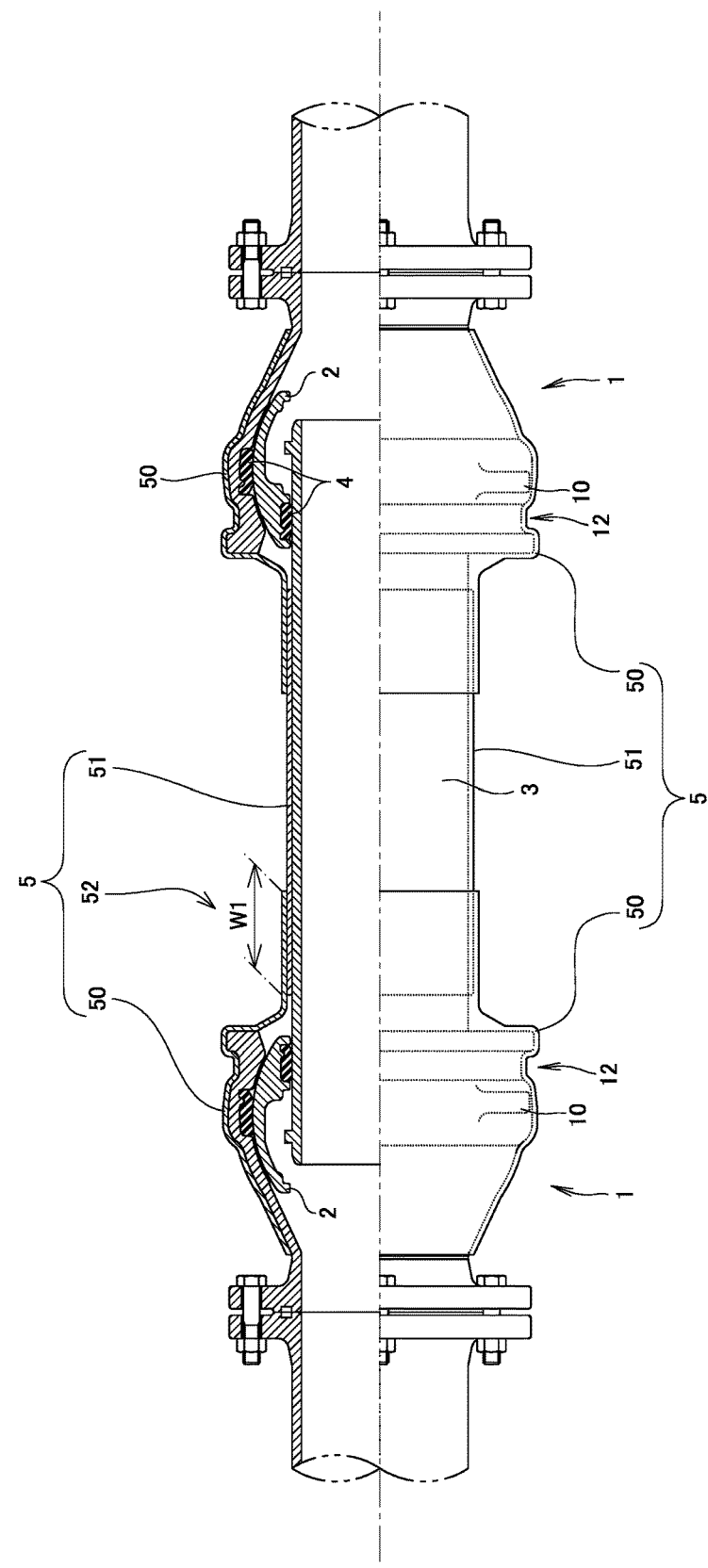
FIG. 2 is a partly broken view showing the inside structure of an expandable-contractible flexible pipe and a coating that coats the expandable-contractible flexible pipe in a first embodiment of the present disclosure.
Figure 3:
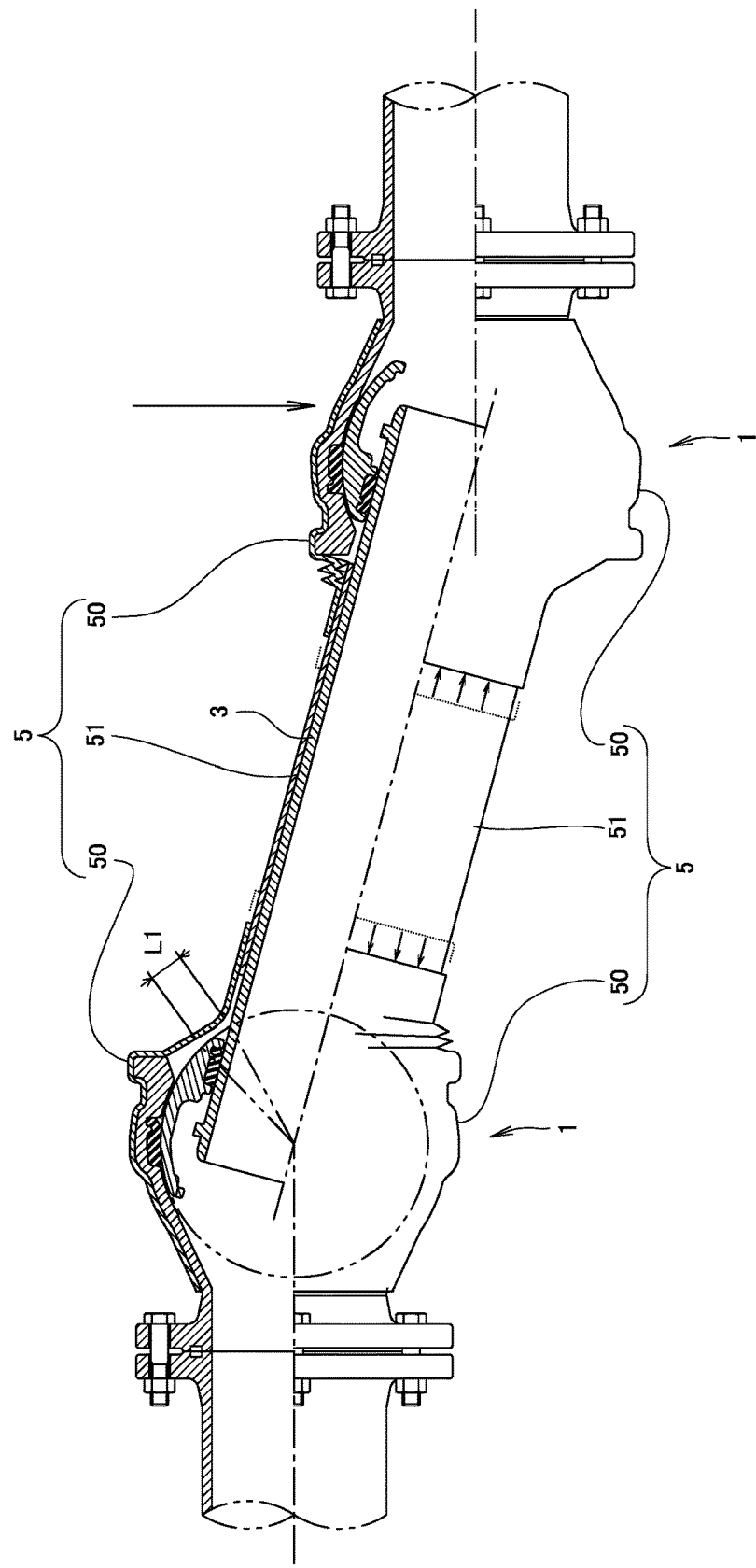
FIG. 3 is a partly broken view showing a state in which the expandable-contractible flexible pipe is bent (i.e., oscillates).

FIG. 1A is a front view showing an expandable-contractible flexible pipe in a direction of the axis of a pipe. FIG. 1B is a side view showing the expandable-contractible flexible pipe. FIG. 2 is a partly broken view showing the inside structure of the expandable-contractible flexible pipe and a coating that coats the expandable-contractible flexible pipe. FIG. 3 is a partly broken view showing a state in which the expandable-contractible flexible pipe is bent (i.e., oscillates).

As shown in FIGS. 1A, 1B, and 2, an expandable-contractible flexible pipe includes a pair of joints 1 to be connected to a fluid pipe such as a water pipe and a connecting pipe 3 for connecting the joints 1 to each other.

The pair of joints 1 is configured to be mutually oscillatable and expandable/contractible. Specifically, the expandable-contractible flexible pipe includes the pair of joints 1, balls 2 held by the joints 1 in an oscillatable manner on predetermined centers, respectively, and a connecting pipe 3 held by the balls 2 in an expandable/contractible manner. The connecting pipe 3 is expandable/contractible with respect to the balls 2, and furthermore, the balls 2 are oscillatable with respect to the joints 1. Therefore, the pair of joints 1 are configured to be oscillatable and expandable/contractible with respect to each other. Seals 4 are disposed at the joints 1, the balls 2, and the connecting pipe 3, and therefore, they are connected to each other in a water tight manner.

A constriction 12 having a recess formed in such a manner as to make a circuit in a circumferential direction is formed at the outer peripheral surface of the joint 1. Moreover, at the outer peripheral surface of the joint 1, a plurality of flanges 10 projecting in a radial direction are formed at intervals in the circumferential direction, thereby forming projections and depressions along the circumferential direction. Although four flanges are formed in the circumferential direction in the embodiment shown in the drawings, only two flanges may be formed in the circumferential direction. Incidentally, although the flange 10 has a rod hole 11, not shown, into which a tie rod is inserted, no tie rod is used in the present embodiment.

As shown in FIG. 2, the expandable-contractible flexible pipe is coated with a resin or rubber coating 5. The coating 5 includes a joint coating portion 50 in close contact with the joint 1, a pipe coating portion 51 in close contact with the connecting pipe 3, and a looseness portion 52 that is formed between the joint coating portion 50 and the pipe coating portion 51 so as to allow the oscillation or expansion of the expandable-contractible flexible pipe.

In the embodiment shown in FIG. 2, the joint coating portion 50 and the pipe coating portion 51 are brought into close contact with the joint 1 and the connecting pipe 3, respectively, by thermally contracting a thermally contractible tube formed into a cylinder. The coating 5 (i.e., the joint coating portion 50) is brought into close contact with the plurality of flanges 10. This suppresses the rotational movement of the coating 5 in the circumferential direction. In addition, the coating 5 (i.e., the joint coating portion 50) bites the constriction 12. This suppresses the detachment of the coating 5 from the joint 1. The thermally contractible tube is made of EPDM (ethylene-propyleneterpolymer rubber), wherein a thickness before thermal contraction is 2 mm whereas a thickness after thermal contraction is 2.5 mm.

The joint coating portion 50 and the pipe coating portion 51 are separate members. They (i.e., the joint coating portion 50 and the pipe coating portion 51) are not fixed at their ends to each other in an overlapping state, but they are slidable with respect to each other. The width W1 of their overlapping portions is equal to at least an elongation quantity required for the coating 5 caused by the oscillation or expansion of the expandable-contractible flexible pipe. As shown in FIG. 3, an elongation quantity L1 required for the coating 5 can be calculated based on an oscillation angle with respect to the peripheral length of the ball 2. For example, in the case where the joints 1 and the connecting pipe 3 are installed in a linear manner, the balls 2 freely oscillate at 15 degrees to maximum, and the nominal diameter of each of the balls 2 is 150 mm, an elongation quantity of about 30 mm is required.

Figure 4:
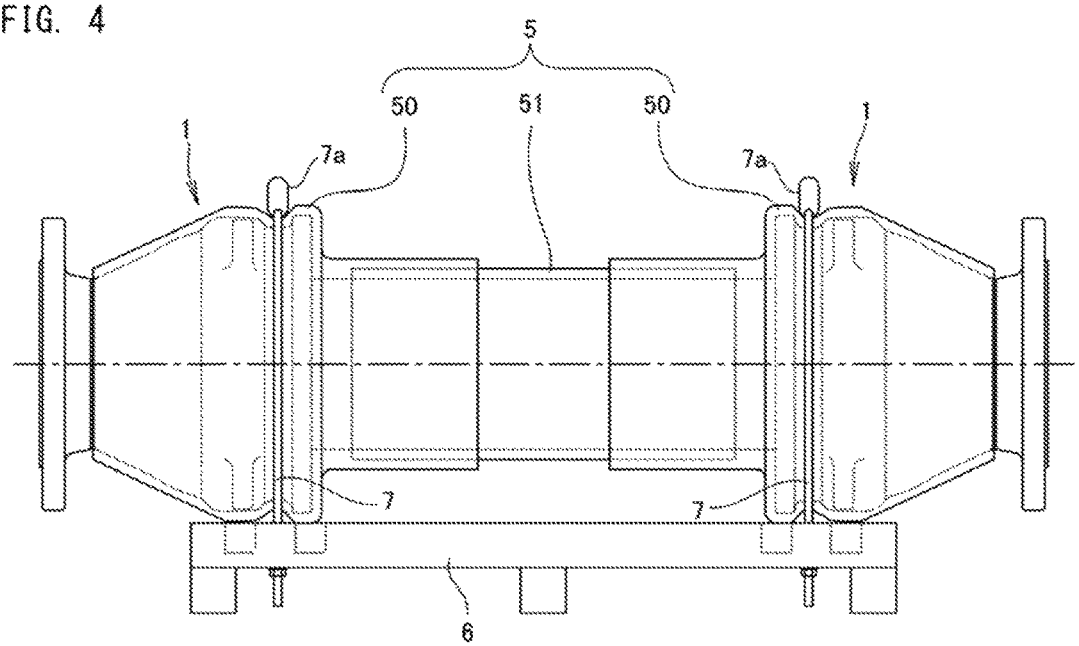
FIG. 4 is a view showing a preferred shipment state of the coated expandable-contractible flexible pipe in the first embodiment.
Figure 4:
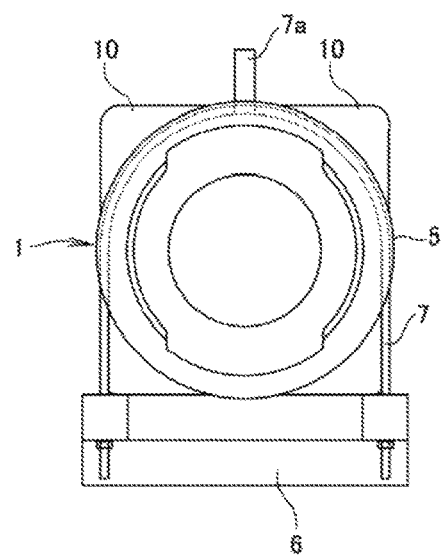

FIG. 4 is a view showing a preferred shipment state of the coated expandable-contractible flexible pipe in the first embodiment. Since the expandable-contractible flexible pipe is oscillatable and expandable/contractible, it is preferable that it should be transported and installed without any movement. Tie rods have been conventionally inserted into the rod holes 11 formed at the flanges 10 via bolts. The formation of the holes at the coating 5 that coats the expandable-contractible flexible pipe for the purpose of the use of the tie rods is unfavorable from the viewpoints of anti-corrosion. In view of this, as shown in FIG. 4, the expandable-contractible flexible pipe further includes a frame 6 stretched between the pair of joints 1 and a pair of U-shaped bolts 7 to be fitted to the constrictions 12 formed at the joints 1. It is preferable that the frame 6 and the U-shaped bolts 7 should be fixed to each other, so as to prohibit the expansion/contraction and oscillation of the pair of joints 1. Fitting a suspension piece 7a to the U-shaped bolt 7 enables the coated expandable-contractible flexible pipe to be transported in a suspended state. Here, although the frame 6 is made of wood whereas the U-shaped bolt 7 is made of metal, their materials are not limited. It is ideal that the U-shaped bolt 7 should be covered with a hose-like tube so as to prevent any damage on the coating 5 caused by direct contact between the U-shaped bolt 7 and the coating 5. However, the U-shaped bolt 7 may not be covered with a tube.

Here, although the thermally contractible tube formed into a cylinder is used as the pipe coating portion 51, a thermally contractible material formed into a tape may be wound.

<Second Embodiment>

Figure 5:
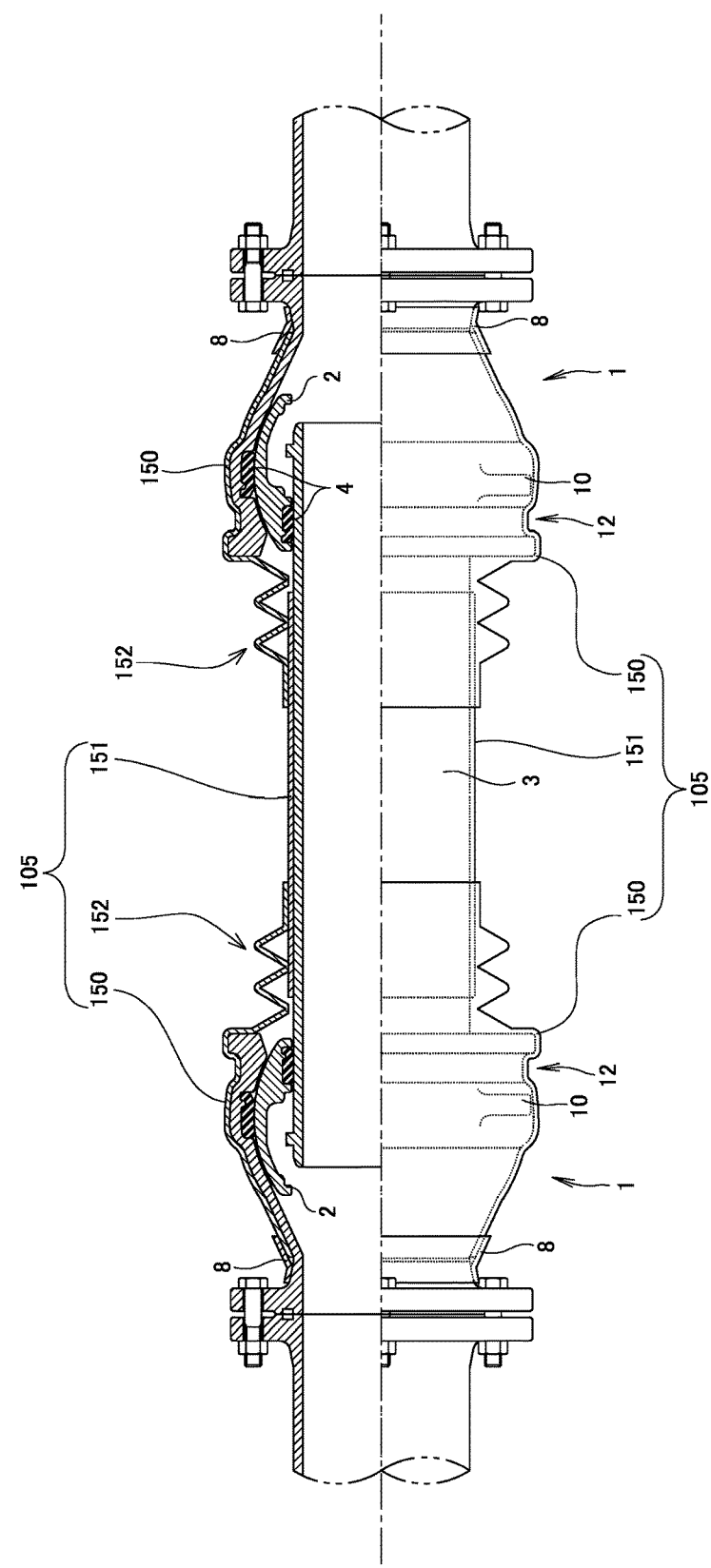
FIG. 5 is a view showing a coated expandable-contractible flexible pipe in a second embodiment.

Hereinafter, a second embodiment according to the present disclosure will be described with reference to the attached drawings. The structure of an expandable-contractible flexible pipe is the same as that in the first embodiment. A difference from the first embodiment resides in the structure of a coating. As shown in FIG. 5, a coating 105 includes a joint coating portion 150, a pipe coating portion 151, and a looseness portion 152. The looseness portion 152 is a sag formed between the joint coating portion 150 and the pipe coating portion 151, the sag having a bellows. In the embodiment shown in FIG. 5, the joint coating portion 150 and the pipe coating portion 151 are separate members. They (i.e., the joint coating portion 150 and the pipe coating portion 151) are fixed at their ends to each other in an overlapping state. They may be fixed to each other by winding a self-fusible tape or via an adhesive.

Incidentally, in the embodiment shown in FIG. 5, in order to prevent water from immersing through between a joint 1 and the coating 5, a self-fusible tape 8 is wound therearound. However, the self-fusible tape 8 may be omitted. In addition, although the joint coating portion 150 and the pipe coating portion 151 are fixed to each other, they may not be fixed to each other.

Figure 6:
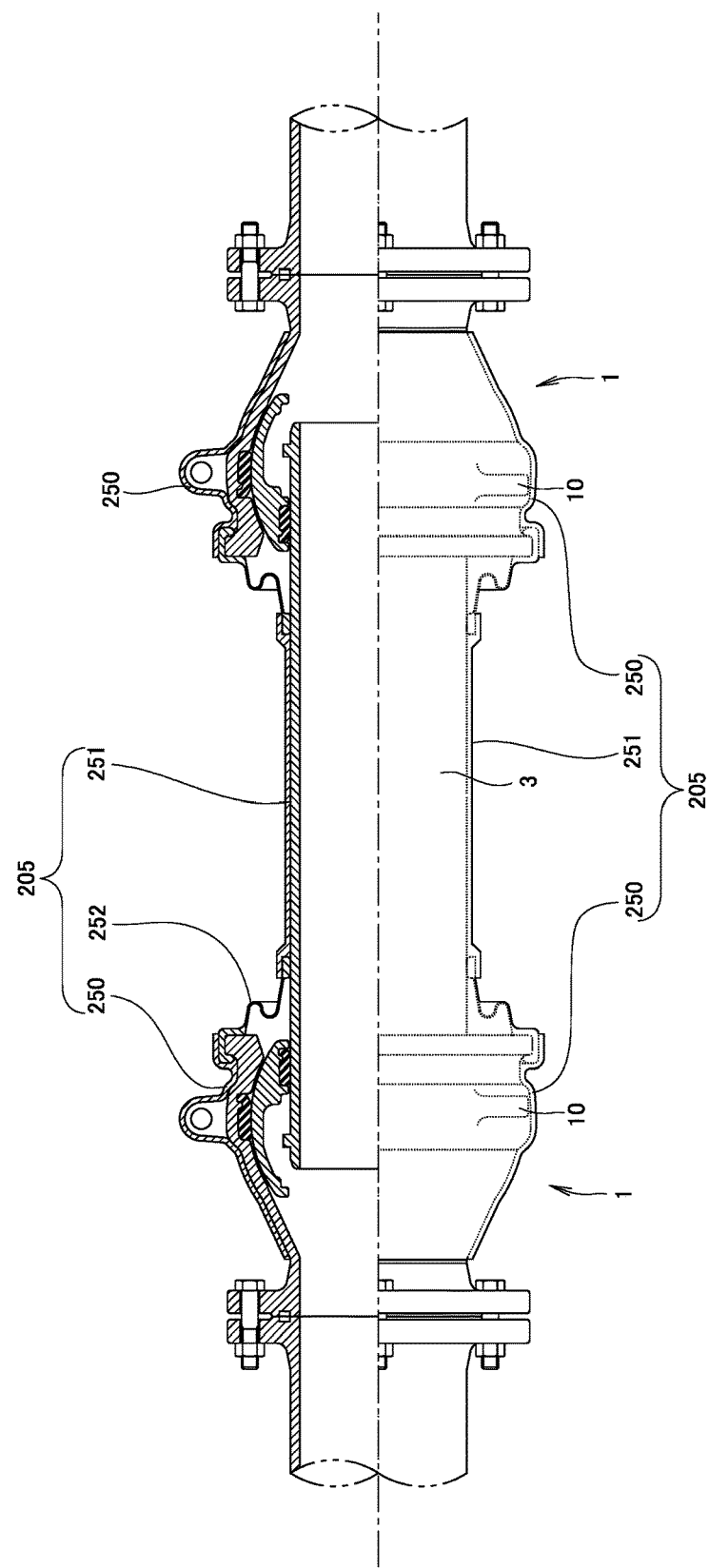
FIG. 6 is a view showing another example of the coated expandable-contractible flexible pipe in the second embodiment.

Moreover, in the embodiment shown in FIG. 5, the sag has the bellows. However, the sag may not have any bellows but just slack. Another example in which no bellows is formed is shown in FIG. 6. A coating 205 shown in FIG. 6 includes a joint coating portion 250, a pipe coating portion 251, and a looseness portion 252. The looseness portion 252 is a sag formed between the joint coating portion 250 and the pipe coating portion 251. A difference from the above-described embodiment resides in thermally contracting the joint coating portion 250 and the pipe coating portion 251 by winding a thermally contractible tape. The looseness portion 252 is a casing cover for connecting the joint coating portion 250 and the pipe coating portion 251 to each other. The material of the casing cover is a synthetic rubber such as EPDM or CR (chloroprene rubber).

<Third Embodiment>

Figure 7:
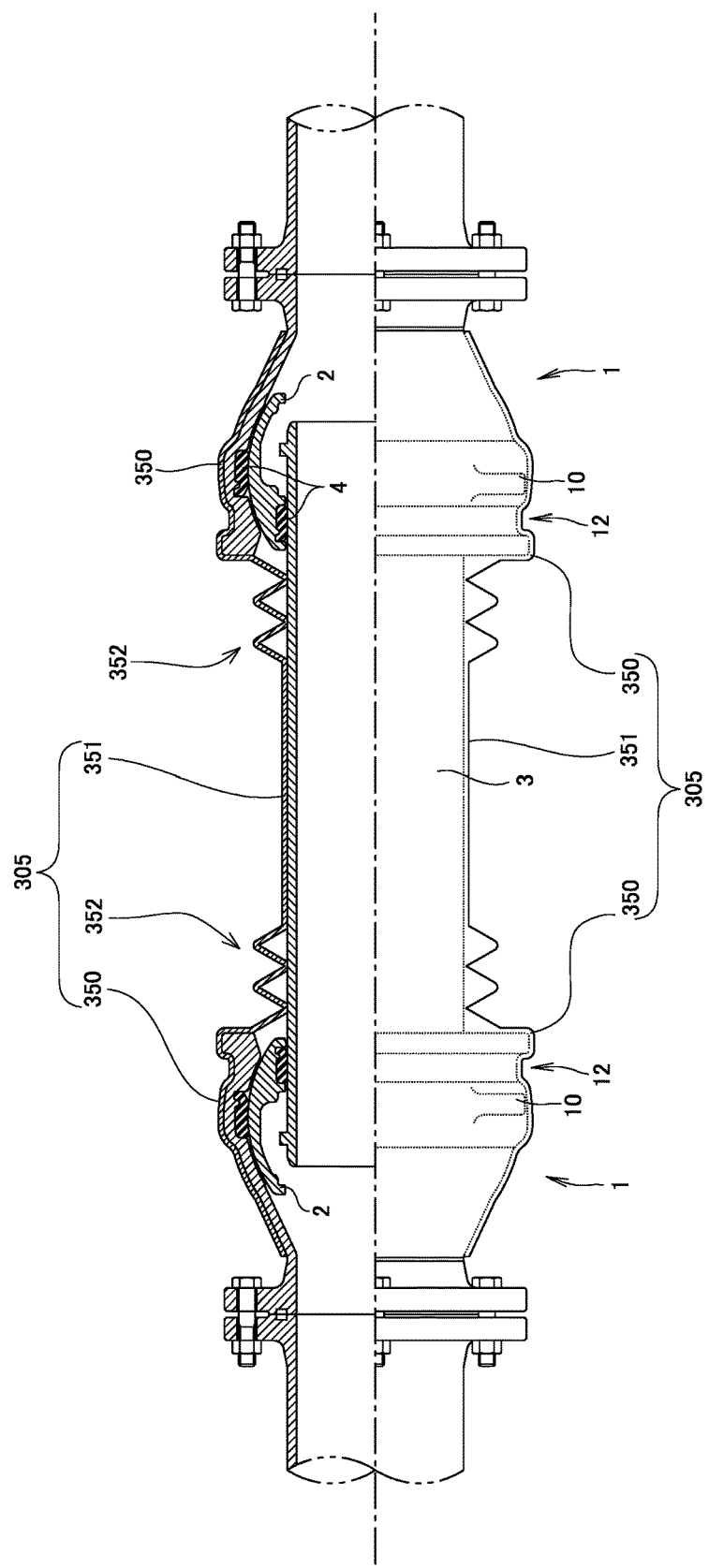
FIG. 7 is a view showing a coated expandable-contractible flexible pipe in a third embodiment.

Hereinafter, a third embodiment according to the present disclosure will be described with reference to the attached drawings. The structure of an expandable-contractible flexible pipe is the same as that in the second embodiment. A difference from the second embodiment resides in the structure of a coating. As shown in FIG. 7, a coating 305 includes a joint coating portion 350, a pipe coating portion 351, and a looseness portion 352. The looseness portion 352 is a sag formed between the joint coating portion 350 and the pipe coating portion 351, the sag having a bellows. It is understood that no bellows should be formed. A difference from the above-described embodiment resides in that the joint coating portion 350 and the pipe coating portion 351 are formed integrally with each other. In this manner, the integral formation of the joint coating portion 350 and the pipe coating portion 351 constituting the coating 305 achieves high sealability and excellent anti-corrosive effect in comparison with the configuration of separate members.

<Anti-Corrosive Structure of Connected Portion Between Expandable-Contractible Flexible Pipe and Fluid Pipe>

Figure 8A:
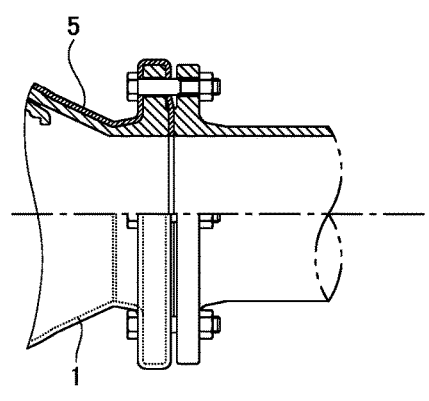
FIG. 8A is a view showing a connected portion between an expandable-contractible flexible pipe and a fluid pipe.

It is preferable that a connected portion between an expandable-contractible flexible pipe and a fluid pipe should be coated from the viewpoint of secureness of anti-corrosion. As shown in, for example, FIG. 8A, an end of a coating 5 is held between a flange of a joint 1 of an expandable-contractible flexible pipe and a flange of a fluid pipe. The use of a sleeve S or a bush B is conceived as a structure of countermeasures to water immersion at a bolt hole in this case, as shown in FIG. 9A.

Figure 8B:
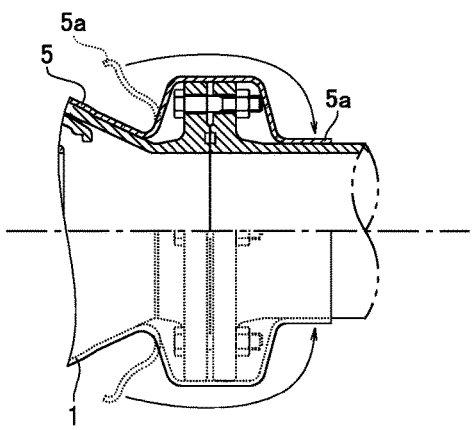
FIG. 8B is another view showing a connected portion between an expandable-contractible flexible pipe and a fluid pipe.

Moreover, as shown in FIG. 8B, a coating margin 5a is formed at the end of a coating 5 for coating a flange. It is preferable that a joint 1 should be covered with the coating margin 5a during shipment and before installation, and then, the coating margin 5a should cover a flange connected portion after the installation.

Figure 8C:
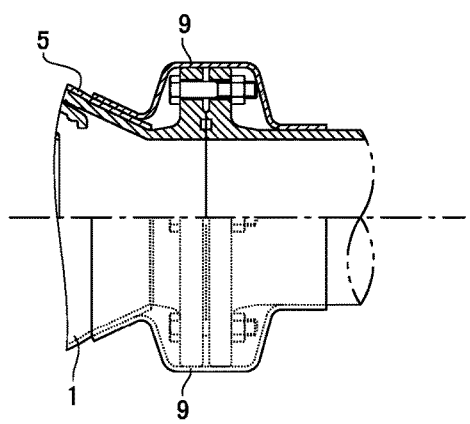
FIG. 8C is a further view showing a connected portion between an expandable-contractible flexible pipe and a fluid pipe.

Additionally, as shown in FIG. 8C, it is construed that a flange coating 9 that coats a flange connected portion between an expandable-contractible flexible pipe and a fluid pipe is used as a member independent of a coating 5 that coats the expandable-contractible flexible pipe.

<Anti-Corrosive Structure in Case of Use of Tie Rod>

Other than the fixing structure for the expandable-contractible flexible pipe shown in FIG. 4, a tie rod T may be used, as shown in FIG. 9A. In this case, a hole, through which the tie rod T is inserted, is formed at a coating 5, thereby inducing a risk of reduction of anti-corrosive performance in comparison with the fixing structure shown in FIG. 4. In order to secure the anti-corrosive performance, the bush B or the sleeve S is inserted into a rod hole 11, into which the tie rod T is inserted, as shown in FIG. 9A, and then, the bush B or the sleeve S is brought into close contact with the coating 5 under pressure. Specifically, as shown in an upper left drawing in FIG. 9B, an elastic body B1 (i.e., rubber such as butyl rubber) is disposed at the outer peripheral surface of the bush B, and then, the bush B is expanded in a radial direction, thus bringing the elastic body B1 and the coating 5 into close contact with each other so as to secure the anti-corrosive performance of the expandable-contractible flexible pipe. Alternatively, as shown in an upper right drawing in FIG. 9C, a male/female type screwed sleeve S is disposed in a rod hole 11 via an elastic body S1 (i.e., butyl rubber), and then, the screwed sleeve S is tightened, thus bringing the elastic body S1 and the coating 5 into press-contact with each other, so as to secure the anti-corrosive performance of the expandable-contractible flexible pipe.

As mentioned above, the coated expandable-contractible flexible pipe of the present embodiment is provided with an expandable-contractible flexible pipe including a pair of joints 1 to be connected to a fluid pipe and a connecting pipe 3 for connecting the joints 1 to each other, the pair of joints 1 being mutually oscillatable and expandable/contractible; and a resin or rubber coating 5 that coats the expandable-contractible flexible pipe. The coating (5, 105, 205, 305) includes a joint coating portion (50, 105, 205, 305) in close contact with the joint 1, a pipe coating portion (51, 151, 251, 351) in close contact with the connecting pipe 3, and a looseness portion (52, 152, 252, 352) formed between the joint coating portion (50, 105, 205, 305) and the pipe coating portion (51, 151, 251, 351) so as to allow the oscillation or expansion of the expandable-contractible flexible pipe.

With this configuration, the coating (5, 105, 205, 305) is brought into close contact with the expandable-contractible flexible pipe. The looseness portion (52, 152, 252, 352) allows the oscillation or expansion/contraction of the pipe. Therefore, even if the coated expandable-contractible flexible pipe embedded in the ground is bent or expands, the coating (5, 105, 205, 305) can follow the oscillation or expansion/contraction, and therefore, the coating cannot be broken, so as to properly secure the anti-corrosive performance of the expandable-contractible flexible pipe.

In the above embodiment, the looseness portion (152, 252, 352) is a sag (152, 252, 352) formed between the joint coating portion (150, 250, 350) and the pipe coating portion (151, 251, 351). In this manner, the sag is provided for the coating, and therefore, the coating can follow the oscillation, so as to properly secure the anti-corrosive performance.

In the above embodiment, the sag (152, 252, 352) has a bellows. With this configuration, the formation of the bellows enables the proper action of the sag because the sag bends along a bending line of the bellows during contraction or retreatment of the sag.

In the above embodiment, the joint coating portion 350 and the pipe coating portion 351 are formed integrally with each other into a cylinder. With this configuration, there is no clearance between the joint coating portion 350 and the pipe coating portion 351, thus fulfilling the expectations of high sealability and excellent anti-corrosive effect.

In the above embodiment, the joint coating portion 150 and the pipe coating portion 151 are separate members, and their ends are fixed to each other in an overlapping manner. With this configuration, it is easy to insert the joint coating portion and the pipe coating portion into the expandable-contractible flexible pipe, thus reducing a fabrication cost.

In the above embodiment, the joint coating portion 50 and the pipe coating portion 51 are separate members, and the joint coating portion 50 and the pipe coating portion 51 slidably overlap each other at their ends, the width of the overlapping portions of the members being equal to at least an elongation quantity L1 required for the coating 5 caused by the oscillation or expansion of the expandable-contractible flexible pipe. With this configuration, the simple configuration can properly secure the anti-corrosive effect.

In the above embodiment, at the outer peripheral surface of the joint, a plurality of flanges 10 projecting in a radial direction are formed at intervals in a circumferential direction, and the coating (5, 105, 205, 305) is brought into close contact with the plurality of flanges 10. With this configuration, the plurality of flanges 10 are formed at intervals in the circumferential direction, and therefore, an interference occurs even if the coating 5 is rotated in the circumferential direction, thus suppressing the rotational movement of the coating 5 in the circumferential direction.

In the above embodiment, a constriction 12 having a recess formed in such a manner as to make a circuit in the circumferential direction is formed at the outer peripheral surface of the joint 1, and the coating (5, 105, 205, 305) bites the constriction 12. With this configuration, it is possible to suppress the detachment of the coating 5 from the joint 1.

In the above embodiment, a frame 6 that is stretched between the pair of joints 1 and a pair of U-shaped bolts 7 to be fitted to the constrictions 12 formed at the joints 1, wherein the frame 6 and the U-shaped bolts 7 are fixed to each other so as to prohibit the expansion/contraction and oscillation of the pair of joints 1. With this configuration, the expandable-contractible flexible pipe can be fixed without forming any hole at the coating, and therefore, it is possible to provide a product suitable for transportation and installation while securing the anti-corrosive performance of the coated expandable-contractible flexible pipe.

The present disclosure is not limited to the above-described embodiments, and therefore, various improvements and alterations can be conceived within a scope without departing from the gist of the present disclosure.

For example, the coating may be made of either a resin or rubber. Preferred materials of the coating include soft polyvinyl chloride, polyethylene, and EPDM. In consideration of easy construction and anti-corrosive performance, it is preferably construed that the thickness of the coating is about 0.5 mm in the case of the soft polyvinyl chloride, about 2 mm in the case of polyethylene, and about 2 mm in the case of EPDM.

The present disclosure is not limited to a water pipe, and it is applicable to pipes in which various kinds of liquid or gas flow. In addition, the structure adopted in each of the embodiments can be adopted in any other embodiments.

DESCRIPTION OF REFERENCE SIGNS

1 . . . Joint
10 . . . Flange
12 . . . Constriction
2 . . . Ball
3 . . . Connecting pipe
5, 105, 205, 305 . . . Coating
50, 150, 250, 350 . . . Joint coating portion
51, 151, 251, 351 . . . Pipe coating portion
52, 152, 252, 352 . . . Looseness portion
6 . . . Frame
7 . . . U-shaped bolt

The invention claimed is:

1. A coated expandable-contractible flexible pipe comprising:
an expandable-contractible flexible pipe including a pair of joints to be connected to a fluid pipe and a connecting pipe for connecting the joints to each other, the pair of joints being mutually oscillatable and expandable/contractible; and
a resin or rubber coating that coats the expandable-contractible flexible pipe,
wherein the coating includes a joint coating portion in close contact with the joint, a pipe coating portion in close contact with the connecting pipe, and a looseness portion formed between the joint coating portion and the pipe coating portion so as to allow the oscillation or expansion of the expandable-contractible flexible pipe,
wherein the joint coating portion and the pipe coating portion are separate members, and their ends are fixed to each other in an overlapping manner.

2. The coated expandable-contractible flexible pipe according to claim 1, wherein the looseness portion is a sag formed between the joint coating portion and the pipe coating portion.

3. The coated expandable-contractible flexible pipe according to claim 2, wherein the sag has a bellows.

4. The coated expandable-contractible flexible pipe according to claim 1,
wherein at an outer peripheral surface of the joint, a plurality of flanges projecting in a radial direction are formed at intervals in a circumferential direction, and
the coating is brought into close contact with the plurality of flanges.

5. A coated expandable-contractible flexible pipe comprising:
an expandable-contractible flexible pipe including a pair of joints to be connected to a fluid pipe and a connecting pipe for connecting the joints to each other, the pair of joints being mutually oscillatable and expandable/contractible; and
a resin or rubber coating that coats the expandable-contractible flexible pipe, wherein the coating includes a joint coating portion in close contact with the joint, a pipe coating portion in close contact with the connecting pipe, and a looseness portion formed between the joint coating portion and the pipe coating portion so as to allow the oscillation or expansion of the expandable-contractible flexible pipe,
wherein the joint coating portion and the pipe coating portion are separate members, and the joint coating portion and the pipe coating portion slidably overlap each other at their ends, the width of the overlapping portions of the members being equal to at least an elongation quantity required for the coating caused by the oscillation or expansion of the expandable-contractible flexible pipe.

6. The coated expandable-contractible flexible pipe according to claim 5, wherein the looseness portion is a sag formed between the joint coating portion and the pipe coating portion.

7. The coated expandable-contractible flexible pipe according to claim 6, wherein the sag has a bellows.

8. The coated expandable-contractible flexible pipe according to claim 5,
wherein at an outer peripheral surface of the joint, a plurality of flanges projecting in a radial direction are formed at intervals in a circumferential direction, and
the coating is brought into close contact with the plurality of flanges.

9. A coated expandable-contractible flexible pipe comprising:
an expandable-contractible flexible pipe including a pair of joints to be connected to a fluid pipe and a connecting pipe for connecting the joints to each other, the pair of joints being mutually oscillatable and expandable/contractible; and
a resin or rubber coating that coats the expandable-contractible flexible pipe,
wherein the coating includes a joint coating portion in close contact with the joint, a pipe coating portion in close contact with the connecting pipe, and a looseness portion formed between the joint coating portion and the pipe coating portion so as to allow the oscillation or expansion of the expandable-contractible flexible pipe, wherein a constriction having a recess formed in such a manner as to make a circuit in the circumferential direction is formed at an outer peripheral surface of the joint, and the coating bites the constriction, further comprising a frame that is stretched between the pair of joints and a pair of U-shaped bolts to be fitted to the constrictions formed at the joints, wherein the frame and the U-shaped bolts are fixed to each other so as to secure the coated expandable-contractible flexible pipe du ring transport.

10. The coated expandable-contractible flexible pipe according to claim 9, wherein at an outer peripheral surface of the joint, a plurality of flanges projecting in a radial direction are formed at intervals in a circumferential direction, and the coating is brought into close contact with the plurality of flanges.

11. The coated expandable-contractible flexible pipe according to claim 9, wherein the looseness portion is a sag formed between the joint coating portion and the pipe coating portion.

12. The coated expandable-contractible flexible pipe according to claim 11, wherein the sag has a bellows.

13. The coated expandable-contractible flexible pipe according to claim 9, wherein the joint coating portion and the pipe coating portion are formed integrally with each other into a cylinder.

* * * * *